(12) United States Patent
Fehling et al.

(10) Patent No.: US 9,254,841 B2
(45) Date of Patent: Feb. 9, 2016

(54) METHOD AND CONTROL UNIT FOR ACTIVATING ACTUATORS OF A VEHICLE DURING EMERGENCY OPERATION

(71) Applicants: Marcus Fehling, München (DE); Gunter Freitag, München (DE); Karl Josef Kuhn, München (DE)

(72) Inventors: Marcus Fehling, München (DE); Gunter Freitag, München (DE); Karl Josef Kuhn, München (DE)

(73) Assignee: Siemens Aktiengesellschaft, München (DE)

( * ) Notice: Subject to any disclaimer, the term of this patent is extended or adjusted under 35 U.S.C. 154(b) by 42 days.

(21) Appl. No.: 14/023,401

(22) Filed: Sep. 10, 2013

(65) Prior Publication Data

US 2014/0074336 A1 Mar. 13, 2014

(30) Foreign Application Priority Data

Sep. 11, 2012 (DE) .......................... 10 2012 216 089

(51) Int. Cl.
*B60W 30/00* (2006.01)
*B60W 10/18* (2012.01)
(Continued)

(52) U.S. Cl.
CPC .............. *B60W 30/00* (2013.01); *B60W 10/18* (2013.01); *B60W 10/20* (2013.01); *B60W 10/30* (2013.01); *Y02T 10/7005* (2013.01)

(58) Field of Classification Search
CPC ........... Y02T 10/7005; Y02T 10/7077; Y02T 10/6286; Y02T 10/6217; Y02T 10/642; Y02T 10/6239; Y02T 10/7022; Y02T 10/7066; Y02T 10/7241; Y60W 10/18; B60W 10/184; B60W 2510/0657; B60W 2510/0676; B60W 2510/068; B60W 2510/1005
USPC ..................... 701/22, 70, 42, 53, 1, 21, 68, 72
See application file for complete search history.

(56) References Cited

U.S. PATENT DOCUMENTS

2001/0033106 A1    10/2001    Shirai et al.
2001/0048226 A1*   12/2001    Nada .......................... 290/40 C (Continued)

FOREIGN PATENT DOCUMENTS

DE         10056968 A1    5/2002
DE       102008043943 A1    7/2009
DE       102009030817 A1   11/2010

OTHER PUBLICATIONS

German Office Action for German Patent Application No. 10 2012 216 089.2, mailed Apr. 15, 2013.

*Primary Examiner* — Truc M Do
(74) *Attorney, Agent, or Firm* — Lempia Summerfield Katz LLC

(57) ABSTRACT

A method includes determining failure of a drive energy store of a vehicle and activating generator operation of a electric main engine as a result of the failure. The method includes determining a current driving condition of the vehicle, what actuators are necessary in order to put the vehicle into a safe operating condition, and what each of the necessary actuator dynamics are based on the current driving condition of the vehicle. The method includes determining a demand for electrical energy that is necessary for a particular necessary actuator to attain the safe operating condition, and regulating a proportionate generator operation of the electric main engine, taking into consideration electrical energy of the necessary actuators required for carrying out each of the necessary actuator dynamics. The method includes activating the actuators necessary for achieving the safe operating condition with the determined actuator dynamics until the safe operating condition is achieved.

18 Claims, 2 Drawing Sheets

(51) Int. Cl.
   *B60W 10/20*   (2006.01)
   *B60W 10/30*   (2006.01)

(56) References Cited

U.S. PATENT DOCUMENTS

| | | | |
|---|---|---|---|
| 2002/0070557 A1* | 6/2002 | Geis | 290/40 R |
| 2003/0001544 A1* | 1/2003 | Nakanishi | 320/162 |
| 2003/0109357 A1* | 6/2003 | Tabata | 477/109 |
| 2004/0044448 A1* | 3/2004 | Ramaswamy et al. | 701/22 |
| 2005/0146302 A1* | 7/2005 | Kamio et al. | 318/647 |
| 2007/0018615 A1* | 1/2007 | Graf et al. | 320/160 |
| 2008/0150483 A1* | 6/2008 | Morita et al. | 320/122 |
| 2008/0234897 A1* | 9/2008 | Tsuchida | 701/42 |
| 2009/0326767 A1* | 12/2009 | Kamada et al. | 701/48 |
| 2010/0225258 A1* | 9/2010 | Namuduri et al. | 318/400.3 |
| 2011/0015828 A1 | 1/2011 | Shimizu | |
| 2011/0111905 A1* | 5/2011 | Tiwari et al. | 475/2 |
| 2011/0241418 A1* | 10/2011 | Nozawa et al. | 303/3 |
| 2012/0104845 A1* | 5/2012 | Pushkolli et al. | 307/10.1 |

\* cited by examiner

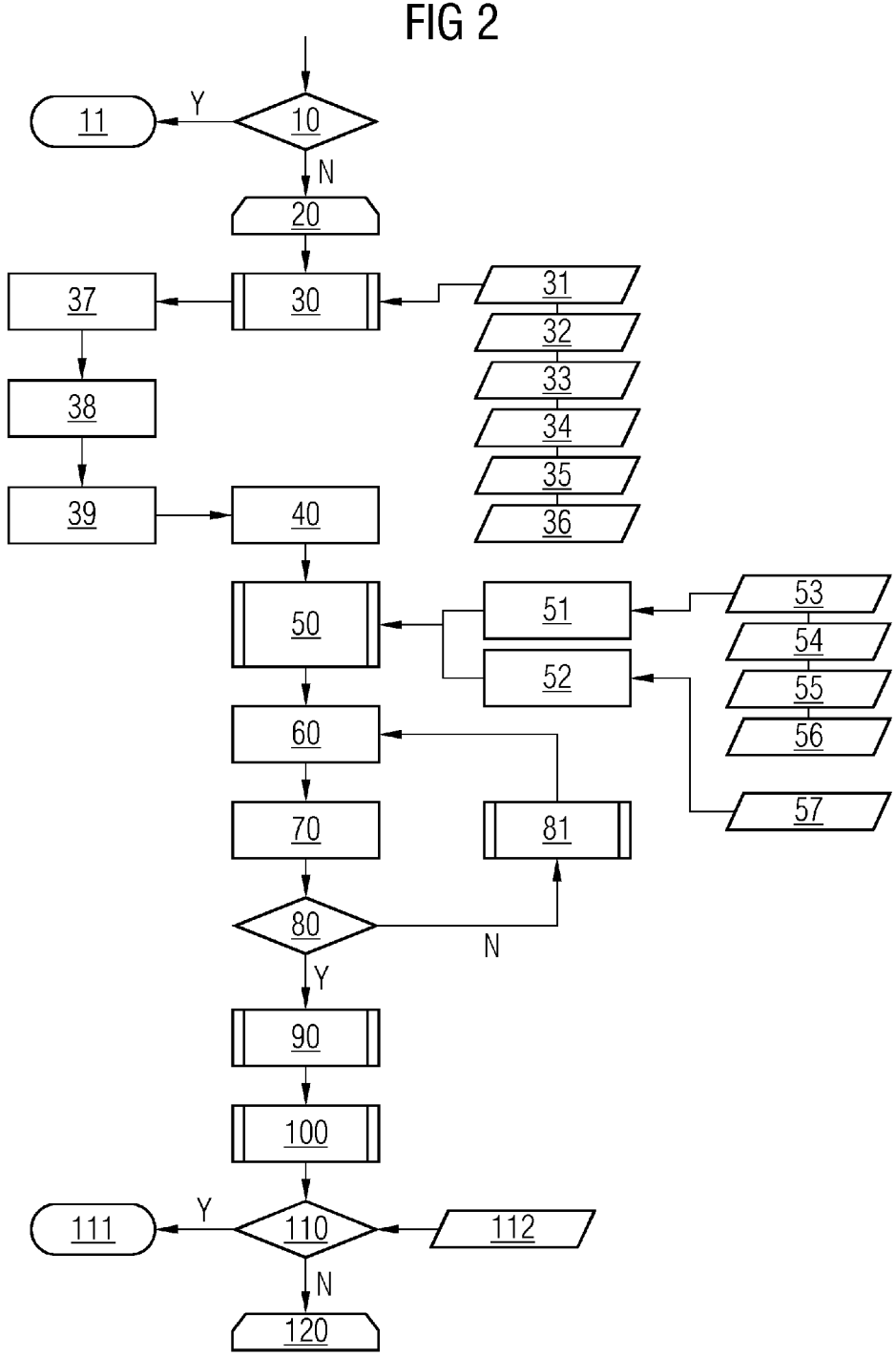

METHOD AND CONTROL UNIT FOR ACTIVATING ACTUATORS OF A VEHICLE DURING EMERGENCY OPERATION

This application claims the benefit of DE 10 2012 216 089.2, filed on Sep. 11, 2012, which is hereby incorporated by reference in its entirety.

BACKGROUND

The present embodiments relate to a method and control unit for activating actuators of a vehicle during emergency operation.

In the future, vehicles with electric main engines will be widespread. An electric main engine may be operated with a voltage range of 100 to 800 V for vehicles with an electric or hybrid drive. This represents a high voltage in comparison with the usual on-board electrical systems of motor vehicles, which may operate in a voltage range of 12 to 24 volts.

An on-board electrical system dedicated to the main engine may be referred to as a high-voltage network, and an on-board electrical system operating in the usual voltage range may be referred to as a low-voltage network. In this kind of electric or hybrid vehicle, high-voltage networks and low-voltage networks are combined into a multi-voltage on-board electrical system.

Electric or hybrid vehicles may be equipped with a drive energy store, which is dedicated to the high-voltage circuit of the vehicle. The drive energy store is thus also referred to as a high-voltage energy store.

The drive energy store may underlie comprehensive diagnostic measures both during and also outside of the driving operation. For example, a fault in the drive energy store and a thereby shortened remaining driven distance is to be indicated promptly to a vehicle driver so that the vehicle does not come to a halt in a remote area due to an empty drive energy store. It is thus to be assumed that the drive energy store is a sufficiently well monitored component in the vehicle.

Failure of the drive energy store may result in dramatic consequences if the vehicle is equipped exclusively with electrically-actuatable brake and/or steering actuators (e.g., "brake-by-wire" and "steer-by-wire," respectively).

The brake actuators indicated render conventional brake hydraulics superfluous. The vehicle driver nevertheless actuates a brake pedal of the vehicle as normal (e.g., presses against a spring or spring force generated by the spring, which simulates the normal feeling of a pedal). In a control unit of the vehicle, a brake force for each wheel of the vehicle is calculated herefrom. A contact force is generated on the individual wheels from brake pads of the brake unit on a brake disk by an electromechanical unit including an electric motor and spindle.

The steering actuators mentioned render conventional transmission mechanisms such as steering links superfluous. A steering command applied to the steering device by the vehicle driver is not directly mechanically applied to the steering gear and thereby eventually to the wheels to be steered, but rather indirectly via a steering actuator.

For reasons of synergy, the drive energy store may also draw on the electrically-actuatable braking and steering actuators for energy supply. As the drive energy store is sufficiently well monitored, the energy supply of the electrically-actuatable actuators is provided during normal driving operation.

Sudden failure of the drive energy store when the vehicle is at full speed would however result in the steering or braking commands from the vehicle driver not being carried out by the braking and/or steering actuators. A further problem that would occur upon failure of the drive energy store is the supply of electric current to electrically-actuatable coolant actuators or coolant pumps. A failure of the drive energy store may result in overheating and destruction of the main engine and power electronic components assigned thereto.

SUMMARY AND DESCRIPTION

The scope of the present invention is defined solely by the appended claims and is not affected to any degree by the statements within this summary.

Alternatives are to be provided for an emergency operation, which enable redundancy in the electric power supply of those actuators that are indispensable or suitable for bringing the vehicle into a safe operating state. These actuators, which include the aforementioned braking, steering and coolant actuators, may be subsequently referred to as "necessary actuators."

A further, redundant drive energy store is not practical in a high-voltage circuit for economic reasons. A high-voltage energy store requires a considerable amount of space in the vehicle, which may not be available. The weight of a normal high-voltage energy store is so substantial that incorporation of two energy stores is already uneconomical for weight reasons. Considerations of cost also play a decisive role in ruling out a redundant supply of the high-voltage circuit with two drive energy stores.

The present embodiments may obviate one or more of the drawbacks or limitations in the related art. For example, a method for actuating actuators of a vehicle suitable for bringing the vehicle into a safe operating state in an emergency situation without a redundant drive energy store is provided.

One embodiment of the method includes, without regard to the sequence of method acts, establishing failure of a drive energy store, activating generator operation of a main engine as a result of the failure, and determining a current driving condition of the vehicle. The method also includes determining what actuators are necessary in order to put the vehicle into a safe operating state, and what each of the necessary actuator dynamics are based on a current driving condition of the vehicle. The method includes establishing a demand for electrical energy that is necessary for a respectively required actuator to attain a safe operating condition and regulating a proportionate generator operation of the main engine, taking into consideration the electrical energy of the necessary actuators required for carrying out each of the necessary actuator dynamics. The method also includes controlling the actuators necessary for achieving the safe operating condition with the determined actuator dynamics until the safe vehicle operating condition is achieved.

A determination is carried out in order to establish whether or not there is a failure in the work energy store. This kind of failure is detected, for example, by a drop in voltage in the high-voltage on-board electricity system. Should there be a failure of the work energy store, then the further method acts are carried out without regard to the sequence indicated.

After a failure, the main engine is put into generator operation (e.g., recuperation operation). In the course of this kind of recuperation, the kinetic energy of the vehicle is transformed into electrical energy. The recuperation therefore brings two desired effects: Supply of the high voltage network with electrical energy as a replacement for the electrical energy that has dropped off, which was supplied by the now failed work energy store; and a braking of the vehicle due to the recuperation, which consequently contributes to the vehicle braking and puts the vehicle into the safe operating condition.

The determination of a current driving condition of the vehicle is carried out, including, for example, the vehicle dynamics on the basis of a wish of the driver.

What actuators are necessary in order to establish a safe operating condition, and what each of the necessary actuator dynamics are based on the current driving condition of the vehicle are determined. This kind of determination includes, for example, a calculation of the optimal wheel speeds, a calculation of the optimal brake performance, and a calculation of an optimal steering angle, with the aim of bringing the vehicle into the safe operating condition (e.g., stationary) should the current vehicle dynamics and/or the current traffic situation allow.

Electrical energy needed for each necessary actuator to achieve a safe operating condition is determined. In other words, the energy that is minimally required in order to operate the actuators with the determined actuator dynamics is calculated.

The proportionate generator operation is regulated (e.g., recuperation, of the main engine, taking into consideration the electrical energy of the necessary actuators required for carrying out each of the necessary actuator dynamics). This enables a gradual setting of the generator mode, which complies with the necessary actuators as needed. With this kind of measure, only as much electrical energy is made available by the work machine working in generator operation as is needed to put the vehicle in the safe operating condition with the necessary actuator dynamics. A gradual regulation of the recuperation has the advantage of avoiding an abrupt recuperation, which may lead to destabilization of the vehicle due to an abrupt stall.

The activation of the actuators with the predetermined actuator dynamics takes place until the safe operating condition of the vehicle is achieved.

In terms of the sequence of method acts, only the establishing of the failure constitutes the beginning of the method, while the other method acts are to be implemented temporally according to a specialist based on an extensively undetermined, simultaneous and/or overlapping time of implementation. For example, the carrying out of a recuperation in generator operation may only be carried out once the determination and evaluation acts (e.g., the activating of the generator operation, the determining of the current driving condition of the vehicle, the determining of what actuators are necessary in order to put the vehicle into a safe operating state, and what each of the necessary actuator dynamics are based on the current driving condition of the vehicle, and the establishing of the demand for electrical energy that is necessary for a respectively required actuator to attain the safe operating condition) have been started or concluded.

An advantage of the method of one or more of the present embodiments is that the use of the drive energy store in generator mode makes provision of a redundant drive energy store unnecessary. This makes it possible to save weight, costs and installation space in an advantageous manner.

Advantageously, by the provision of a gradual generator operation, only as much electrical energy is generated by the main engine as is required for provision of the necessary actuators. In this way, the heat loss of the main engine may be reduced to a minimum, and too strong a delaying effect resulting from a complete recuperation may be avoided.

The method provides that when emergency operation starts and, for example, when there is a complete failure of the drive energy store while driving the vehicle, a vehicle driver is sufficiently assisted so as to be able to bring the vehicle to a halt while maintaining steering ability. At the same time, enough handling leeway is available to the driver or a driver's assistant to determine the route to and location of halting of the vehicle.

According to an advantageous embodiment of the method, current vehicle dynamics are determined based on a vehicle dynamics specification by the vehicle driver. Determination of the current vehicle dynamics is carried out, for example, from the current speed of the vehicle, a current steering angle of the vehicle, a slippage emerging on the vehicle and/or the yaw rate of the vehicle. The vehicle dynamics specification by a driver driving the vehicle includes, for example, a braking specification from the vehicle driver and/or a steering specification from the vehicle driver.

According to an advantageous development of the method, in order to determine the respectively necessary actuator dynamics, a wheel speed is determined for at least one respective wheel of the vehicle. Determination of brake performance for at least one respective wheel of the vehicle as well as a determination of an angle is advantageous.

According to a further advantageous variant embodiment, it is provided that activation of the actuators necessary for achieving the safe operating condition is set up in such a way that a delay by the vehicle is matched, by activating a brake actuator, to the need for electrical energy by the actuators usually required, in such a way that the delay of the vehicle does not lead to loss of stability.

For example, in critical driving situations such as cornering, driving on ice, snow, gravel etc., in order to avoid destabilization of the vehicle, it can be provided to a limited extent by the delay effect of the recuperation that matching with dynamic regulating function is carried out, in particular with the functions for activating the contact brakes. The particularity of this match is that the delay is adjusted by the recuperation with the electricity use of the electricity required for the braking and steering maneuvers and coolant requirements, wherein requirements from dynamic regulation are confronted and then the braking force distribution is matched.

As is shown in both following variant embodiments, this match can also include the ability to dynamically impair the electricity usage of the steering actuators, e.g. by gradual reduction of the steering force assistance, and/or the coolant pumps, e.g. by increasing or reducing the rate of flow.

According to a further advantageous development of the method according to the invention, it is provided that activation of the braking actuator is set up in such a way that its need for electrical energy is favorably provided by a reduction of electrical energy in activating the steering actuator with regard to a steering force assistance. This kind of measure gives the braking actuator highest priority for the case in which not enough electrical energy is available for secondary actuators, which recede in importance behind the brake actuators.

According to a further advantageous embodiment of the invention, it is provided that a delay from the braking actuators is matched with a requirement for electrical energy by the actuators normally required in such a way that the delay of the vehicle does not lead to overheating. This adjustment therefore fits in particularly well with the coolant pump, which likewise is an actuator in the sense of this illustration.

According to a further advantageous embodiment, provision is made for a determination of the total usage of electrical energy to be repeated, provided that individual actuators are allocated less electrical energy than originally determined, insofar as these individual actuators can still enable achievement of the safe operating condition with less electrical energy.

BRIEF DESCRIPTION OF THE DRAWINGS

FIG. 2 shows a flow diagram of an exemplary embodiment of a method for activating actuators of a vehicle during emergency operation.

DETAILED DESCRIPTION

Figure 1:
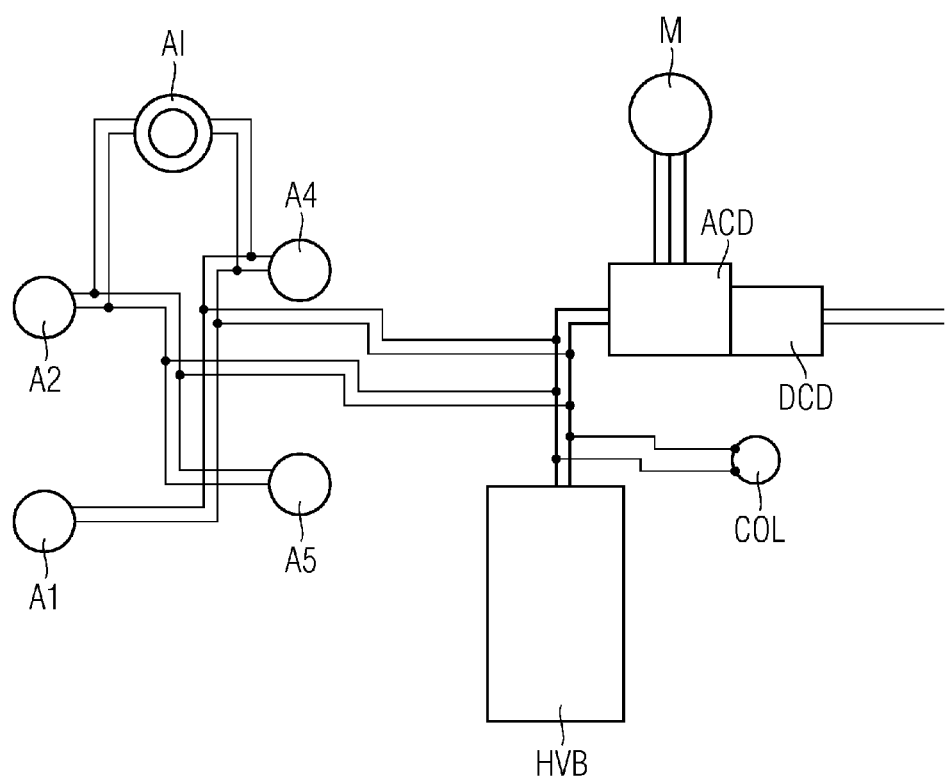
FIG. 1 shows a schematic representation of a coordination of electrical components in a vehicle.

FIG. 1 shows a schematic construction of a multi-voltage on-board electricity supply in a vehicle known from the prior art. A high-voltage network is represented in the representation taking up essentially the whole space of FIG. 1.

A drive energy store HVB, a plurality of actuators A1, ..., A5, a coolant pump COL, and, via an ACD inverter or an AC/DC transformer, an electric main engine M are connected to the high-voltage network. A voltage transformation from the high-voltage network voltage (e.g., 400 or 800 volts direct current) to a vehicle electrical system voltage provided for the low-voltage network is effected by a DC converter DCD. A direct voltage of 12 volts may be provided for the low voltage network. The low-voltage network is symbolized by two parallel lines on the right edge of FIG. 1. The low-voltage network may also be referred to as a secondary network.

An actuator may be an electromechanical functional unit that converts a mechanical movement or other physical variables when supplied with electrical energy based on a command transmitted by a control unit (not shown). Among the aforementioned actuators are, for example, a steering actuator A1 as well as four braking actuators A2, ..., A4. The coolant pump COL is also an actuator in the aforementioned sense.

FIG. 2 shows a schematic sequence of one embodiment of a method for activating actuators of a vehicle in emergency operation.

In decision act 10, availability of the drive energy store is continuously checked.

As long as the drive energy store is available (e.g., the Y alternative, "Yes"), there is no need for a method act for activating the actuators of the vehicle in emergency operation, and the method ends with a provisional ending act 11. If the drive energy store is no longer available during a driving operation (e.g., decision act N, "No"), or if there is a failure of the drive energy store, then emergency operation 20 according to an exemplary embodiment is started.

In act 30, determination of a current driving condition of the vehicle is carried out (e.g., a determination of driving dynamics activities based on specifications of the vehicle driver). The parameters of speed 31, steering angle 32, slip 33, yaw rate 34, braking specification of the vehicle driver 35 and steering specification of the vehicle driver 36 are determined.

The actuators used in order to put the vehicle into a safe operating condition, and the actuator dynamics thereof, are determined on the basis of the current driving condition of the vehicle. A calculation 37 of the optimal wheel speed takes place separately for all the wheels, a calculation 38 of the optimal brake performance separately for all the wheels takes place, and a calculation 39 of the optimal steering angle takes place.

A determination 40 of the requirement for electrical energy used for a respective actuator to attain a safe operating condition based on the actuator dynamics is performed.

In the following calculation 50, an electrical energy minimally required in order to operate the most important of the other actuators is determined.

The calculation 50 includes a calculation 51 of the pump rotational speed provided in order to avoid the main engine and the inverter reaching a critical temperature, and a calculation 52 of a minimum energy usage of the low-voltage network.

For the calculation 51 of the pump rotational speed provided in order to avoid the main engine and the inverter reaching a critical temperature, the parameters of motor temperature 53, inverter temperature 54, coolant temperature in the motor 55 as well as coolant temperature in the inverter 56 are queried.

For the calculation 52 of the minimum energy usage of the low-voltage network components, the energy usage of the direct current transformer 57 is queried.

A calculation 60 of the total energy requirement and a calculation 70 of the proportionate generator operation of the main engine, and therefore of the degree of recuperation, are carried out.

In a decision act 80, whether the energy requirement determined according to act 70 may be covered by recuperation or not is determined.

If the energy requirement determined may not be covered by recuperation (e.g., decision alternative N, "No"), then degradation specifications by users are calculated in a determination act 81 according to priority classes, and the calculation 60 of the total energy requirement and the calculation 70 of the proportionate generator operation of the main engine are repeated once more in order to again carry out the decision act 80 with a test as to whether or not the energy requirement determined may be covered by recuperation.

Upon determination 81 of the degradation specifications, a check is made as to whether or not a delay by the vehicle due to recuperation, or possibly also due to activation of a brake actuator, may be brought into harmony with the requirement for electrical energy from the other necessary actuators such that safe operating conditions may be achieved. In this, prioritization is provided of such a kind that precedence is given to, for example, braking and steering over secondary actuators.

A determination of the total requirement of electrical energy is therefore repeated at least once, provided that individual actuators are allocated less electrical energy than as determined in act 60, insofar as this lower electrical energy allocated to these individual actuators still provides safe operating conditions.

If the energy requirement may be covered by recuperation (e.g., decision alternative Y, "Yes"), then in act 90, the degradation specifications are written into the register of affected actuators, and in act 100, the recuperation is activated.

In a decision act 110, whether or not the vehicle has come to a halt is determined. Therefore, whether or not the parameter 112, which includes the vehicle speed, is equal to zero is determined. If this is the case (e.g., decision alternative Y, 'Yes'), then the method has reached end point 111. If this is not the case (e.g., decision alternative N, "No"), then in act 120, the method branches out to the beginning 20 of the method.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for activating actuators of a vehicle during emergency operation, the vehicle comprising a drive energy store for coordination with an electric main engine, wherein the electric main engine is operable in motor operation, in generator operation, or in motor and generator operation, the vehicle comprising a plurality of electrically-actuatable actuators, the method comprising:
    determining failure of the drive energy store;
    activating the generator operation of the electric main engine as a result of the failure;
    determining a current driving condition of the vehicle;
    determining actuators to be used in order to put the vehicle into a safe operating condition and actuator dynamics on a basis of the current driving condition of the vehicle;
    determining a demand for electrical energy for at least one of the actuators to attain the safe operating condition;
    regulating a proportionate generator operation of the electric main engine, taking into consideration an electrical energy of the actuators for carrying out each of actuator dynamics; and
    activating the actuators for achieving the safe operating condition with the determined actuator dynamics until the safe operating condition for the vehicle is achieved, wherein the activating the actuators is such that a delay by the vehicle is matched by activation of a brake actuator.

2. The method as claimed in claim 1, wherein the determining of the current driving condition of the vehicle includes determining current driving dynamics based on a driving dynamics specification by a driver driving the vehicle.

3. The method as claimed in claim 2, wherein the determining of the current driving dynamics includes speed of the vehicle, steering angle of the vehicle, slip happening to the vehicle, yaw rate of the vehicle, or a combination thereof.

4. The method as claimed in claim 3, wherein the driving dynamics specification by the driver driving the vehicle includes a braking specification by the driver, a steering specification by the driver, or a combination thereof.

5. The method as claimed in claim 1, wherein the determining of the actuator dynamics comprises determining a wheel speed for a wheel of the vehicle, determining a brake performance for the wheel or another wheel of the vehicle, determining a steering angle, or a combination thereof.

6. The method as claimed in claim 1, wherein the delay by the vehicle is matched by the activation of the brake actuator with a need for electrical energy by the actuators being required such that the delay of the vehicle does not lead to loss of stability.

7. The method as claimed in claim 1, wherein the activation of the brake actuator is carried out such that in favor of a need for electrical energy, the electrical energy is reduced when activating a steering actuator with regard to a steering force support.

8. The method as claimed in claim 1, wherein the activation of the brake actuator is carried out such that the delay by the vehicle is matched by the brake actuator with an electrical energy requirement of the other actuators such that the delay of the vehicle does not lead to overheating of the vehicle.

9. The method of claim 8, wherein the other actuators comprise a coolant pump.

10. The method as claimed in claim 1, further comprising determining a total requirement for electrical energy for achieving the safe operating condition from a requirement for electrical energy for a particular necessary actuator.

11. The method as claimed in claim 10, wherein the determining of the total requirement for electrical energy is repeated at least once when individual actuators are allocated less electrical energy than the determined demand for electrical energy, and the electrical energy allocated to the individual actuators provides the safe operating condition.

12. The method as claimed in claim 2, wherein the determining of the actuator dynamics comprises determining a wheel speed for a wheel of the vehicle, determining a brake performance for the wheel or another wheel of the vehicle, determining a steering angle, or a combination thereof.

13. The method as claimed in claim 3, wherein the determining of the actuator dynamics comprises determining a wheel speed for a wheel of the vehicle, determining a brake performance for the wheel or another wheel of the vehicle, determining a steering angle, or a combination thereof.

14. The method as claimed in claim 4, wherein the determining of the actuator dynamics comprises determining a wheel speed for a wheel of the vehicle, determining a brake performance for the wheel or another wheel of the vehicle, determining a steering angle, or a combination thereof.

15. The method as claimed in claim 6, wherein the activation of the brake actuator is carried out such that the delay by the vehicle is matched by the brake actuator with an electrical energy requirement of the other actuators such that the delay of the vehicle does not lead to overheating of the vehicle.

16. The method as claimed in claim 4, further comprising determining a total requirement for electrical energy for achieving the safe operating condition from a requirement for electrical energy for a particular actuator.

17. A control unit for activating actuators of a vehicle during emergency operation, the vehicle comprising a drive energy store for coordination with an electric main engine, a plurality of electrically-actuatable actuators, wherein the electric main engine is operable in motor operation, in generator operation, or in motor operation and generator operation, the control unit comprising:
    a sensor unit configured to determine failure of the drive energy store;
    an activation unit configured to activate the generator operation of the electric main engine as a result of the failure;
    a driving dynamics determination unit configured to determine, based on a current driving condition of the vehicle, actuators to put the vehicle into a safe operating condition and actuator dynamics;
    a determination unit configured to determine a demand for electrical energy for a particular actuator to attain the safe operating condition;
    a regulating unit configured to regulate a proportionate generator operation of the electric main engine taking into consideration an electrical energy of the actuators required for carrying out each actuator dynamic; and
    a driving dynamics control unit configured to activate the actuators for achieving the safe operating condition with the determined actuator dynamics until the safe operating condition is achieved, wherein the actuators are activated such that a delay by the vehicle is matched by activation of a brake actuator.

18. A vehicle comprising:
a control unit for activating actuators of the vehicle during emergency operation;
a drive energy store for coordination with an electric main engine; and
a plurality of electrically-actuatable actuators,
wherein the electric main engine is operatable in motor operation, in generator operation, or in motor operation and generator operation, and
wherein the control unit comprises:
- a sensor unit configured to determine failure of the drive energy store;
- an activation unit configured to activate the generator operation of the electric main engine as a result of the failure;
- a driving dynamics determination unit configured to determine, based on a current driving condition of the vehicle, what actuators are necessary in order to put the vehicle into a safe operating condition, and what each of the necessary actuator dynamics are;
- a determination unit configured to determine a demand for electrical energy that is necessary for a particular necessary actuator to attain the safe operating condition;
- a regulating unit configured to regulate a proportionate generator operation of the electric main engine taking into consideration an electrical energy of the necessary actuators required for carrying out each necessary actuator dynamic; and
- a driving dynamics control unit configured to activate the actuators necessary for achieving the safe operating condition with the determined actuator dynamics until the safe operating condition is achieved, wherein the actuators are activated such that a delay by the vehicle is matched by activation of a brake actuator.

* * * * *